United States Patent
Helmick et al.

(10) Patent No.: US 10,635,355 B1
(45) Date of Patent: Apr. 28, 2020

(54) BANDWIDTH LIMITING IN SOLID STATE DRIVES

(71) Applicant: Western Digital Technologies, Inc., San Jose, CA (US)

(72) Inventors: Daniel Helmick, Broomfield, CO (US); James Walsh, Santa Clara, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/189,963

(22) Filed: Nov. 13, 2018

(51) Int. Cl.
  *G06F 3/06*  (2006.01)
  *G06F 13/16*  (2006.01)
  (Continued)

(52) U.S. Cl.
  CPC .......... *G06F 3/0659* (2013.01); *G06F 3/0688* (2013.01); *G06F 13/1621* (2013.01); *G06F 13/1642* (2013.01); *G06F 13/1668* (2013.01); *G06F 13/1673* (2013.01); *G06F 13/24* (2013.01); *G06F 13/4068* (2013.01)

(58) Field of Classification Search
  CPC ...... G06F 3/0602; G06F 3/0604; G06F 3/061; G06F 3/0611; G06F 3/0613; G06F 3/0688; G06F 2003/0691; G06F 13/16; G06F 13/1642; G06F 13/1668; G06F 13/1673; G06F 13/18; G06F 13/24; G06F 13/26; G06F 13/4068; G06F 2213/2404;
  (Continued)

(56) References Cited

U.S. PATENT DOCUMENTS 9,430,412 B2  8/2016  Huang
9,483,431 B2  11/2016  Bergsten et al.
(Continued)

FOREIGN PATENT DOCUMENTS

CN  107870820 A  4/2018
WO  2016073074 A1  5/2016

OTHER PUBLICATIONS

"NVM Express™". Revision 1.0e. Jan. 23, 2013. NVM Express, Inc. (Year: 2013).*
(Continued)

*Primary Examiner* — Thomas J. Cleary
(74) *Attorney, Agent, or Firm* — Patterson & Sheridan, LLP; Steven Versteeg

(57) ABSTRACT

The present disclosure generally relates to limiting bandwidth in storage devices. One or more bandwidth quality of services levels may be selected and associated with commands according to service level agreements, which may prioritize some commands over others. A storage device fetches and executes one or more the commands. Each of the commands is associated with a bandwidth quality of service level. After executing the commands and transferring the data to a host device, the storage device may delay writing a completion entry corresponding to the executed commands to a completion queue based on the associated bandwidth quality of service level of the commands. The device may then delay revealing the completion entry by delaying updating a completion queue head pointer. The device may further delay sending an interrupt signal to the host device based on the associated bandwidth quality of service level of the commands.

20 Claims, 9 Drawing Sheets

(51) Int. Cl.
*G06F 13/24* (2006.01)
*G06F 13/40* (2006.01)

(58) Field of Classification Search
CPC .......... G06F 2213/2406; G06F 3/0659; H04L 29/08945; H04L 29/08954
See application file for complete search history.

(56) References Cited

U.S. PATENT DOCUMENTS

| | | | |
|---|---|---|---|
| 9,792,051 | B2 | 10/2017 | Liu et al. |
| 10,185,678 | B1* | 1/2019 | Stoler ..................... G06F 13/28 |
| 10,387,078 | B1* | 8/2019 | Benisty ................. G06F 3/0659 |
| 2011/0179413 | A1* | 7/2011 | Subramanian ...... G06F 9/45558 718/1 |
| 2015/0317176 | A1 | 11/2015 | Hussain et al. |
| 2016/0119443 | A1* | 4/2016 | Susarla .............. H04L 67/2842 709/213 |
| 2017/0010992 | A1* | 1/2017 | Sarcone ................. G06F 13/26 |
| 2017/0017516 | A1* | 1/2017 | Sato ........................ G06F 13/14 |
| 2017/0075834 | A1* | 3/2017 | Cha ........................ G06F 13/24 |
| 2017/0177222 | A1 | 6/2017 | Singh et al. |
| 2017/0177262 | A1* | 6/2017 | Sharma ................. G06F 3/0616 |
| 2017/0322897 | A1* | 11/2017 | Benisty .................. G06F 13/37 |
| 2018/0088978 | A1 | 3/2018 | Li et al. |
| 2018/0121102 | A1* | 5/2018 | Paulzagade ........... G06F 3/0611 |
| 2018/0260136 | A1* | 9/2018 | Huo ..................... G06F 3/0611 |
| 2018/0275872 | A1* | 9/2018 | Benisty ................... G06F 3/061 |
| 2018/0284989 | A1* | 10/2018 | Kachare ................. G06F 3/065 |
| 2018/0321945 | A1* | 11/2018 | Benisty ................. G06F 3/0659 |
| 2018/0321987 | A1* | 11/2018 | Benisty ................... G06F 9/528 |
| 2018/0337867 | A1* | 11/2018 | Davies ................... H04L 47/26 |
| 2018/0341410 | A1* | 11/2018 | Benisty ................. G06F 3/0611 |
| 2019/0146684 | A1* | 5/2019 | Benisty ................. G06F 3/0613 |
| 2019/0250848 | A1* | 8/2019 | Benisty ................. G06F 3/0604 |
| 2019/0272107 | A1* | 9/2019 | Kim ..................... G06F 3/0611 |

OTHER PUBLICATIONS

González et al. "Multi-Tenant I/O Isolation with Open-Channel SSDs," Mar. 2017, 2 pages.

Yang et al. "H-NVMe: A Hybrid Framework of NVMe-based Storage System in Cloud Computing Environment," 2017 IEEE 36th International Performance Computing and Communications Conference (IPCCC), San Diego, CA, 2017, 8 pages, 10.1109/PCCC.2017.8280431.

Zhengyu, Yang et al; "H-NVMe: A Hybrid Framework of NVMe-based Storage System in Cloud Computing Enviroment"; https://ieeexplore.ieee.org/document/8280431; Performance Computing and Communities Conference (IPCCC), IEEE 36th International; San Diego, CA, Dec. 10-12, 2017 (3 pages).

* cited by examiner

BANDWIDTH LIMITING IN SOLID STATE DRIVES

BACKGROUND OF THE DISCLOSURE

Field of the Disclosure

Embodiments of the present disclosure generally relate to storage devices, such as sold state drives (SSDs).

Description of the Related Art

Service Level Agreements (SLAs) are often held by retailers of SSDs, or persons selling storage solutions, who have multi-tenant systems. Each multi-tenant system may cover many subscribers and customers, virtual machines, or applications, all of which desire a share of the available bandwidth of the system. As available bandwidth is a limited resource, the SLAs generally assure a quantity of available drive bandwidth and quality of service (QoS) for different price tiers. SLAs also aim to provide customers with an assured and accurate QoS and/or bandwidth throughput guarantees. SLAs may limit BW, QoS, or in a combination of both available to the tenants, and may set minimums, maximums, and relational changes in both BW and QoS. The assurances in an SLA may be to provide a minimum or a maximum quantity of bandwidth or QoS. For example, a higher paying customer may be assured a greater quantity of bandwidth, in which case the customer's SLA would like assure a minimum quantity of bandwidth and a maximum degradation of QoS while other tenant's traffic is occurring.

Methods of limiting available bandwidth include slowing down the data flow rate or counting bytes or number of commands as the commands are processed in an SSD. However, these methods may consume large amounts of bandwidth in the process, and may be considered invasive or heavy-handed. As such, these methods can be wasteful and inefficient.

Thus, what is needed is a reliable and accurate method of limiting bandwidth in SSDs without limiting data speeds and consuming large quantities of SSD resources.

SUMMARY OF THE DISCLOSURE

The present disclosure generally relates to limiting bandwidth in storage devices. One or more bandwidth quality of services levels may be selected and associated with commands according to service level agreements, which may prioritize some commands over others. A storage device fetches and executes one or more the commands. Each of the commands is associated with a bandwidth quality of service level. After executing the commands and transferring the data to a host device, the storage device may delay writing a completion entry corresponding to the executed commands to a completion queue based on the associated bandwidth quality of service level of the commands. The device may then delay revealing the completion entry by delaying updating a completion queue head pointer. The device may further delay sending an interrupt signal to the host device based on the associated bandwidth quality of service level of the commands.

In one embodiment, a method of operating a storage device comprises executing, by a controller of the storage device, a command associated with a bandwidth quality-of-service level. The command is executed at full speed. The method further comprises delaying writing a completion entry corresponding to the executed command for a predetermined amount of time. The predetermined amount of time is based on the associated bandwidth quality-of-service level. The method comprises triggering the completion entry corresponding to the executed command to be written to a completion queue. The writing of the completion entry to the completion queue is triggered after the predetermined amount of time is met.

In another embodiment, a storage device comprises one or more memory devices and a controller coupled to the one or more memory devices. The controller is configured to fetch a command associated with a bandwidth and a quality-of-service level from a submission queue at full speed, execute the command, write a completion entry corresponding to the executed command to a completion queue, and delay sending an interrupt signal indicating the completion queue is ready to be read. The delay is based on the bandwidth and the quality-of-service level associated with the command.

In yet another embodiment, a storage system comprises a host device and a storage device coupled to the host device. The storage device comprises one or more memory devices and a controller coupled to the one or more memory devices. The controller is configured to fetch a plurality of commands from a submission queue at full speed, read headers of each of the plurality of commands to determine an associated bandwidth quality-of-service level of each of the plurality of commands, and execute the plurality of commands in order of high to low priority based on the associated bandwidth quality-of-service level of each of the plurality of commands.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
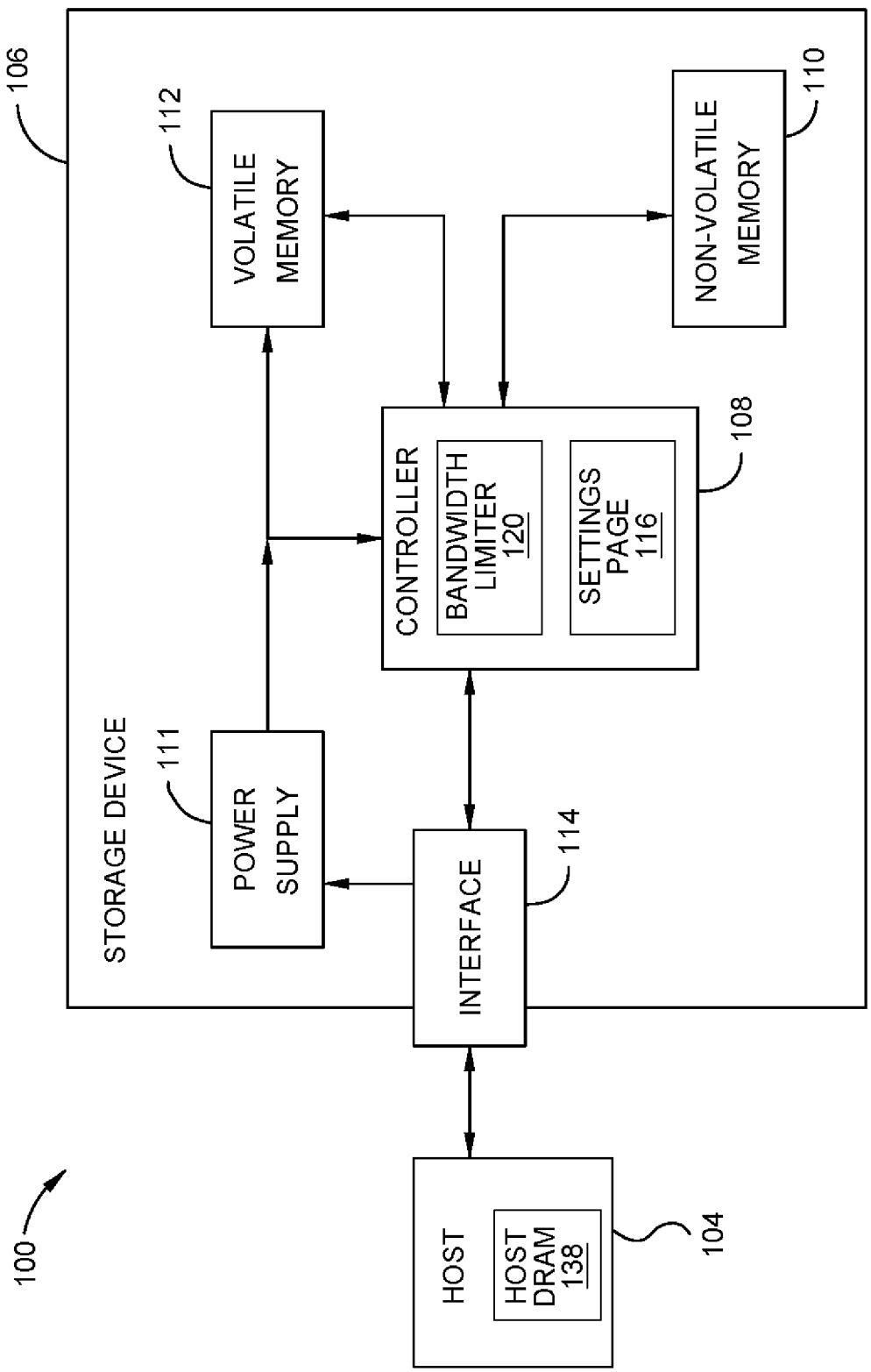
FIG. 1 is a schematic block diagram illustrating a storage system, according to one embodiment.

The present disclosure generally relates to limiting bandwidth in storage devices. One or more bandwidth quality of services levels may be selected and associated with commands according to service level agreements, which may prioritize some commands over others. A storage device fetches and executes one or more the commands. Each of the commands is associated with a bandwidth quality of service level. After executing the commands and transferring the data to a host device, the storage device may delay writing a completion entry corresponding to the executed commands to a completion queue based on the associated bandwidth quality of service level of the commands. The device may then delay revealing the completion entry by delaying updating a completion queue head pointer. The device may further delay sending an interrupt signal to the host device based on the associated bandwidth quality of service level of the commands. FIG. 1 is a schematic block diagram illustrating a storage system 100 in which storage device 106 may function as a storage device for a host device 104, in accordance with one or more techniques of this disclosure. For instance, the host device 104 may utilize non-volatile memory devices included in storage device 106 to store and retrieve data. The host device 104 comprises a host DRAM 138. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, the storage device 106 includes a controller 108, non-volatile memory 110 (NVM 110), a power supply 111, volatile memory 112, a bandwidth limiter 120, and an interface 114. In some examples, the storage device 106 may include additional components not shown in FIG. 1 for sake of clarity. For example, the storage device 106 may include a printed board (PB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

NVM 110 may comprise a plurality of flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The storage device 106 includes a controller 108, which may manage one or more operations of the storage device 106. For instance, the controller 108 may manage the reading of data from and/or the writing of data to NVM 110. In some embodiments, when the storage device 106 receives a write command from the host device 104, the controller 108 may initiate a data storage command to store data to NVM 110 and monitor the progress of the data storage command. The controller 108 may determine at least one operational characteristic of the storage system 100 and store the at least one operational characteristic to NVM 110.

The storage device 106 includes a bandwidth limiter 120 coupled to the controller 108. The bandwidth limiter 120 monitors and controls access to the available bandwidth of the storage system 100. The bandwidth limiter 120 prioritizes each request for bandwidth based on a respective QoS level, and controls access to the available bandwidth. QoS is a statistical aggregate description of command latencies from the drive. Either a maximum command latency, average command latency impact, a statistical description of all the commands an assurance of 99% of the commands executing by some limit, or a complete description of all of the command latencies versus the probability of that latency (shown in a plot frequently). In some embodiments, the bandwidth limiter 120 may be a hardware circuit located within the storage device 106. In other embodiments, the bandwidth limiter 120 is located in firmware in the storage device 106. In yet other embodiments, the bandwidth limiter 120 is executed in software located within the storage device 106. The bandwidth limiter 120 may be hardware, firmware, or software located within the controller 108. The bandwidth limiter 120 may also be located remotely from the storage device 106 in a server or other processor. Other embodiments are possible and are not limited by the examples disclosed herein.

The storage device 106 includes a bandwidth limiter 120 and a settings page 116 coupled to the controller 108. The settings page 116 may determine a QoS level. The bandwidth limiter 120 monitors and controls access to the available bandwidth of the storage system 100. The bandwidth limiter 120 prioritizes each request for bandwidth based on a respective QoS level, and controls access to the available bandwidth. QoS is a statistical aggregate description of command latencies from the drive. Either a maximum command latency, average command latency impact, a statistical description of all the commands an assurance of 99% of the commands executing by some limit, or a complete description of all of the command latencies versus the probability of that latency (shown in a plot frequently). In some embodiments, the bandwidth limiter 120 may be a hardware circuit located within the storage device 106. In other embodiments, the bandwidth limiter 120 is located in firmware in the storage device 106. In yet other embodiments, the bandwidth limiter 120 is executed in software located within the storage device 106. The bandwidth limiter 120 may be hardware, firmware, or software located within the controller 108. The bandwidth limiter 120 may also be located remotely from the storage device 106 in a server or other processor. Other embodiments are possible and are not limited by the examples disclosed herein.

Figure 2:
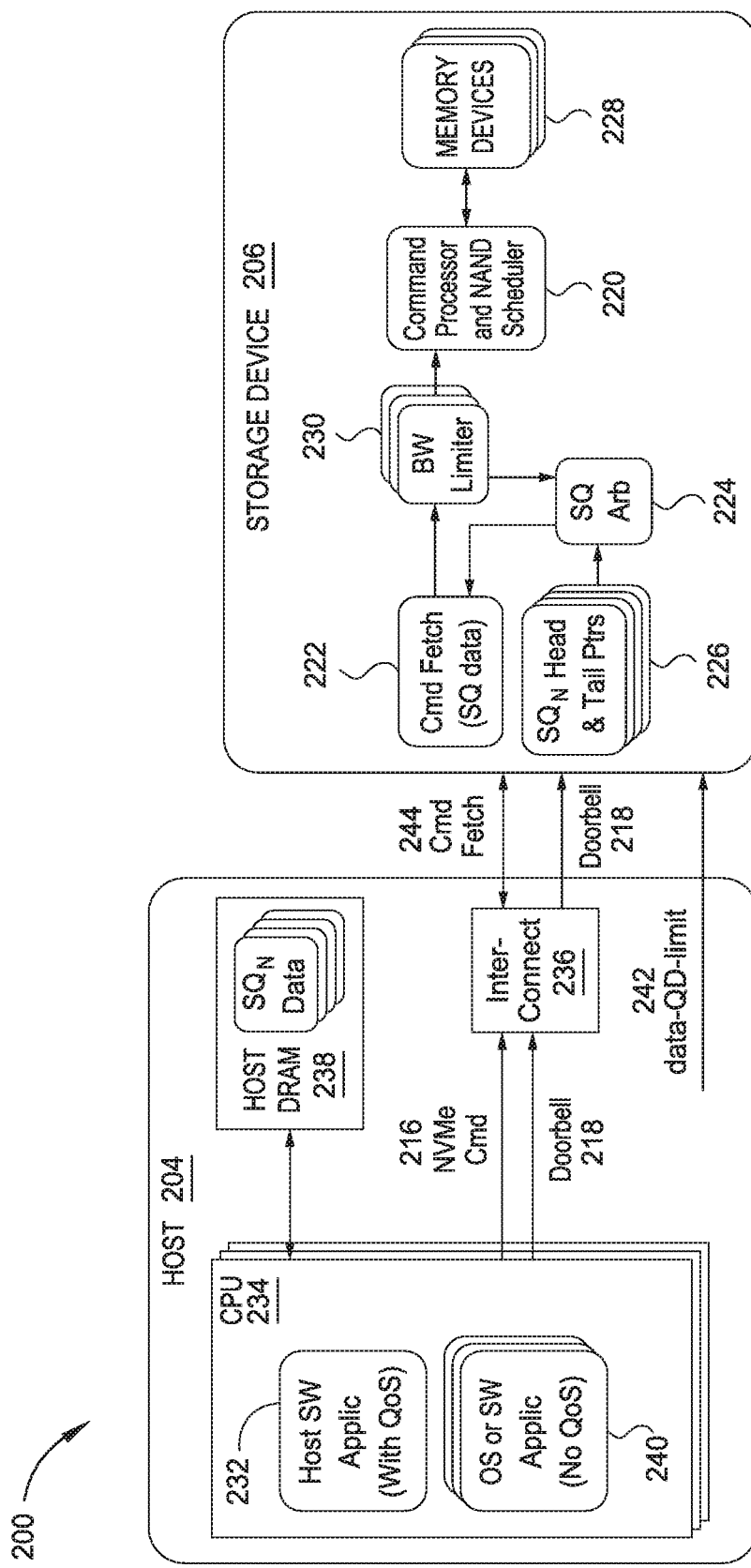
FIG. 2 illustrates a storage system comprising a storage device coupled to a host device, according to another embodiment.

FIG. 2 illustrates a storage system 200 comprising a storage device 206 coupled to a host device 204, according to another embodiment. Storage system 200 may be the storage system 100, the host device 104, and the storage device 106 of FIG. 1.

The storage device 206 may send and receive commands and data from the host device 204, and comprises a command processor 220. The command processor 220 may schedule memory device access, such as NAND access, and may perform a read to a memory device prior to a previously received command requiring a write to the same memory device. The command processor 220 is coupled to a bandwidth limiter 230 and one or more memory devices 228. The one or more memory devices 228 may be NAND non-volatile memory devices. The bandwidth limiter 230 is coupled to a command fetch 222. The command fetch 222 is coupled to a submission queue arbitration 224. The submission queue arbitration 224 is coupled to one or more submission queue head and tail pointers 226.

The host device 204 is comprised of one or more host software applications 232 coupled to one or more processing units or CPU applications 234. In one embodiment, the software application 232 has limited solid-state drive queue depth in order to derive a latency QoS for each user of the system 200. The host device 204 further comprises an operating system (OS) or software application 240 without an associated QoS. The CPU 234 is coupled to an interconnect 236 and to a host DRAM 238. The host DRAM 238 may store submission queue data. The interconnect 236 is coupled to the device 206. The interconnect 236 may be in communication with both the submission queue head and tail pointers 226 and the command fetch 222.

The CPU 234 generates one or more commands 216 to send to the device 206, and may send and receive commands from the device 206 via the command fetch signal 244. The CPU 234 may further send an interrupt or doorbell 218 to the device 206 to notify the device 206 of the one or more commands 216. The CPU 234 may differentiate between commands based on a bandwidth QoS level associated with each command. The associated bandwidth QoS level determines the priority of the commands. For example, in a multi-tenant system with pricing tiers, a higher paying customer will have a higher priority. As such, any commands generated by the higher paying customer through the CPU 234 will have an associated bandwidth QoS level directly corresponding to the higher priority level.

The CPU 234 may limit data-queue depth submitted to the device 206. Queue depth (QD) is the maximum number of commands queued to the device 206, and data-QD is the amount of data associated with the commands queued with a QD. In one embodiment, the data-QD 242 of the storage device 206 is equal to the bandwidth of the storage device 206. Data-QD 242 is limited to the highest level under which the device 206 can still maintain a desired latency QoS. The host device 204 may select a target latency QoS for the storage system 200, and may also limit an associated data-QD 242 of the storage system 200. For selecting the latency QoS target, the device 206 may provide information to the host driver 234. Such information may include the latency QoS capabilities of the device 206, an approximate maximum data-QD limit associated with a particular latency QoS target, and/or multiple pairs of data-QD limits or QoS target values. Additionally, the host device 204 may keep a data-QD of the system 200 under a current data-QD limit.

Figure 3:
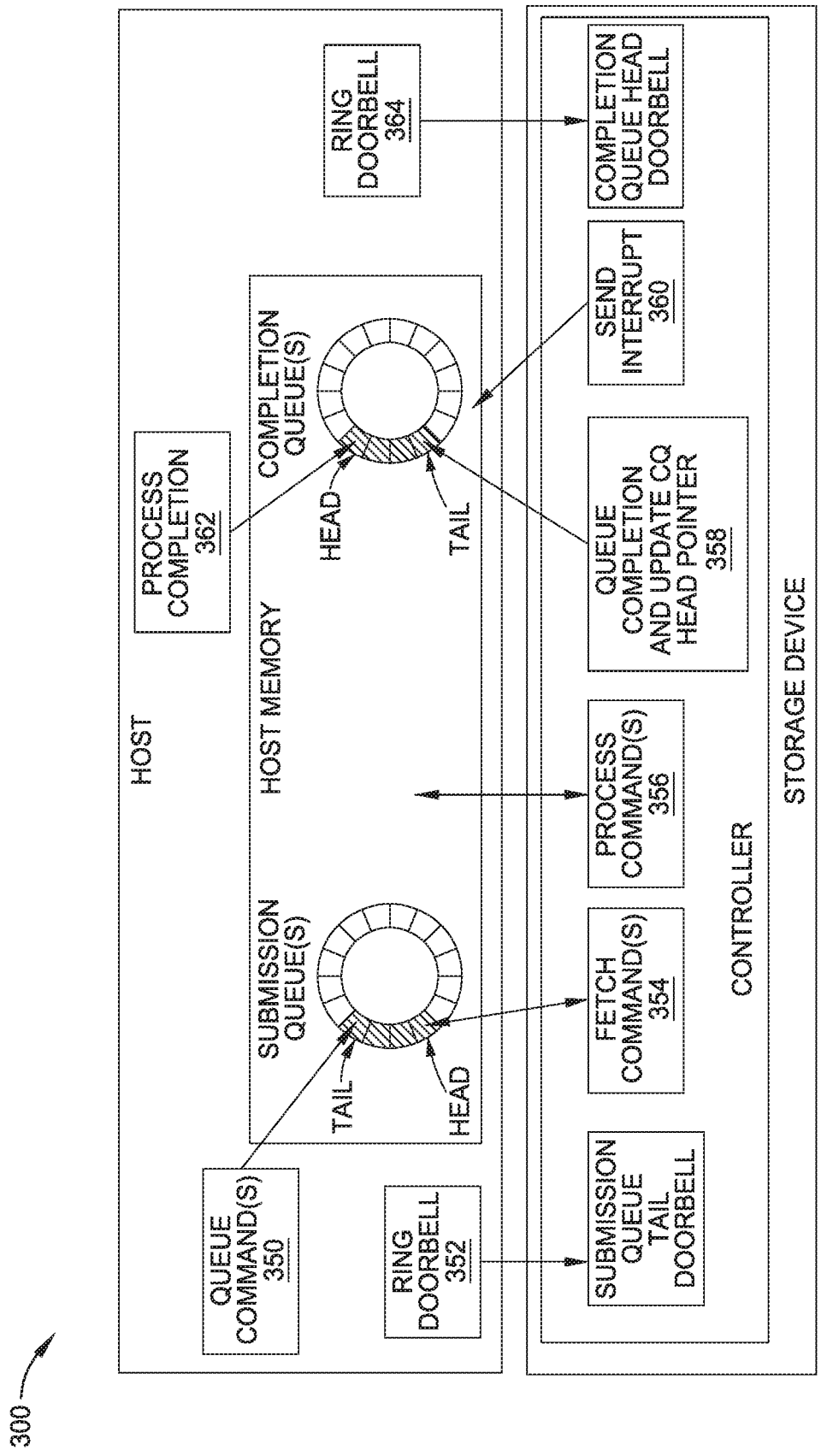
FIG. 3 is a block diagram illustrating a method of limiting bandwidth between a host and a storage device, according to one embodiment.

FIG. 3 is a block diagram illustrating a method 300 of limiting bandwidth between a host and a storage device when executing a read command, according to one embodiment. Method 300 may be used with the storage system 100 having a host device 104 and a storage device 106 comprising a controller 108. Method 300 may further be used with the storage system 200 having a host device 204 and a storage device 206 comprising a command processor 220.

Method 300 begins at operation 350, where the host device writes a command into a submission queue as an entry. The host device may write one or more commands into the submission queue at operation 350. The commands may be read commands or write commands. The host device may write the command with an associated bandwidth QoS level. For example, the host device may write the associated bandwidth QoS level of a command in a header of the command. The bandwidth QoS level associated with each command directly corresponds to a priority rank and prioritizes some commands over others. For example, a higher paying customer or user will have a higher priority than a lower paying customer, and thus, will have a higher or greater bandwidth QoS level. There may be any number of various priority ranks or levels. For example, there may be five tiers of bandwidth QoS levels, with level one being the lowest priority and level five being the highest priority.

The host device may comprise one or more submission queues. Commands may be written into the one or more submission queues based on priority. For example, the host may have a first submission queue for high ranking commands, a second submission queue for mid-level ranking commands, and a third submission queue for low ranking commands.

In operation 352, the host device writes one or more updated submission queue tail pointers and rings a doorbell or sends an interrupt signal to notify or signal the storage device of the new command that is ready to be executed. The doorbell signal may be the doorbell 218 of FIG. 2. The host may write an updated submission queue tail pointer and send a doorbell or interrupt signal for each of the submission queues if there are more than one submission queues. In operation 354, in response to receiving the doorbell or interrupt signal, a controller of the storage device fetches the command from the one or more submission queue at full speed. Full speed may be the normal operating speed or fastest bandwidth speed.

Fetching the commands from the submission queue at full speed allows a maximum amount of information to be received by the storage device. Such information may include the number of commands for best queuing and execution, prioritized commands, different namespaces, and different submission queue configurations, among others. Providing the maximum amount of information to the storage device affords for high grade SLA customers to receive the high grade of service. Additionally, a lower grade SLA customer can still be responded to with minimum latency, which can reduce conflicts of storage device resources, including controller SRAM, memory die availability, and toggle mode bus availability, among others.

Upon receiving the command, the controller of the storage device may determine the bandwidth QoS level associated with the command, and thus, may determine the priority rank of the command. The bandwidth QoS level may be retrieved by the storage device from the submission queue with the command. The bandwidth QoS level may be determined based on the location of each command in a submission queue. In at least one implementation, the host device includes the bandwidth QoS level of a command in the header of the command. The storage device may then read the header of the command to determine the associated bandwidth QoS level.

In operation 356, the controller of the storage device processes the command and writes or transfers data associated with the command to the host device memory at full speed. In operation 358, the controller of the storage device writes a completion entry corresponding to the executed command to a completion queue of the host device and moves or updates the CQ head pointer to point to the newly written completion entry. The storage device may delay writing the completion entry to the completion queue and/or delay updating the CQ head pointer. The delay is based on the bandwidth QoS level associated with the executed command. In at least one implementation, the lower the priority of the associated bandwidth QoS level, the longer the delay. Commands associated with the highest priority ranked bandwidth QoS level may have no delay.

Delaying the writing of a completion entry to a completion queue and/or delaying updating the head pointer permits command data to be transferred into the host DRAM or into non-volatile memory while holding the completion entry in the storage device. This provides for optimal availability of the controller SRAM without acknowledging to the host the movement of the command data. Delaying the writing of the completion entry to the completion queue and/or delaying updating the head pointer results in the host being unaware of the progress the storage device has made with the commands and data transfers.

In one embodiment, the completion queue comprises a plurality of completion queues. Each completion queue of the plurality of completion queues may be associated with a different bandwidth QoS level. The bandwidth QoS level associated with the commands may match or be the same as the bandwidth QoS level associated with each completion queue of the plurality of completion queues. Continuing the above example, if there are five bandwidth QoS levels corresponding to five pricing tiers, there would be five corresponding completion queues. The storage device writes a completion entry into the completion queue corresponding to the bandwidth QoS level of the command. For instance, a high prioritized command would be written to a high prioritized completion queue. The plurality of completion queues may be tracked by one or more of global tracking, a predetermined list, or per completion queue.

Operations 350-358 may be repeated one or more times to process a plurality of commands prior to operation 360. Several completion entries may be written to the completion queue in operation 358 without alerting the host device. To alert the host device of the completion entries in the completion queue, the completion queue (CQ) head pointer may be updated to point to the newest ending completion entry, or the last written entry, in the completion queue. Updating the CQ head pointer reveals the one or more completion entries in the completion queue to the host.

In operation 360, the controller of the storage device generates and sends an interrupt signal or doorbell to the host device. The interrupt signal indicates that the command has been executed and data associated with the command is available in memory. The interrupt signal further notifies that the completion queue is ready to be read or processed. The storage device may delay sending the interrupt signal to the host device. The delay is based on the bandwidth QoS level associated with the executed command. In at least one implementation, the lower the priority of the associated bandwidth QoS level, the longer the delay. Commands associated with the highest priority ranked bandwidth QoS level may have no delay.

The storage device may delay updating the CQ head pointer and sending the interrupt signal to the host device until multiple completion entries are written to the completion queue. For example, if the storage device writes one or more completion entries corresponding to low ranked bandwidth QoS levels to the completion queue, the storage device may delay updating the CQ head pointer and sending the interrupt signal until a completion entry associated with a higher ranked bandwidth QoS level is written to the completion queue. By delaying updating the CQ head pointer and sending the interrupt signal until a completion entry associated with a higher ranked bandwidth QoS level is written to the completion queue, the interrupt signal may flush out all completion entries currently in the command queue, including all completion entries written to the completion queue prior to the entry associated with the higher ranked bandwidth QoS level.

The delay in both operations 358 and 360 may be a predetermined amount of time based directly upon the bandwidth QoS level associated with the command. The delay may be caused by a countdown expiring or a count up being met. The storage device may comprise a timer, which may also set the delay according to the bandwidth QoS level associated with a command. The delay may be further based on one or more of a countdown timer, a counter of a number of commands executed, available bandwidth, and a number of commands in the submission queue. The delay may be further based on a maximum or minimum bandwidth descriptor, maximum or minimum QoS assurances, and a mix of QoS and bandwidth maximums and minimums.

In operation 362, the host device processes the completion entry. In operation 364, the host device writes an updated CQ head pointer to the storage device and rings the doorbell or sends an interrupt signal to the storage device to release the completion entry.

In one embodiment, the bandwidth QoS levels and associated parameters are set by a retailer on a settings page of the storage device. When a retailer receives or reboots the storage device, the retailer may select the number of bandwidth QoS levels. The retailer may further select the length of delay associated with each bandwidth QoS level, or the storage device may automatically populate a delay based on the number of bandwidth QoS level utilized. As the retailer enters into SLAs with customers, a predetermined bandwidth QoS level may be assigned to each customer or user based on a pricing tier and stored as a setting in the storage device memory. When a command is received from the host device from a known customer or user, the bandwidth QoS level information is retrieved from the storage device memory and used to determine the priority of the command. The retailer may select other parameters to correspond to the various bandwidth QoS levels.

In another embodiment, each command is associated with a bandwidth QoS level when written to the submission queue, and the commands do not have a predetermined bandwidth QoS level. In such an embodiment, each command would by dynamically assigned a bandwidth QoS level on-the-fly as the system operates. The retailer may further select other parameters to correspond to the various bandwidth QoS levels, such as the length of a delay. The bandwidth QoS level for a given customer or user's command may be established based on the time of day, a customer number, a quantity of commands previously retrieved or currently being fetched, available bandwidth, or other discriminating parameter. Other embodiments are possible and are not limited to these examples.

FIG. 4, FIG. 5, FIG. 6, and FIGS. 7A-7C are flowcharts illustrating various embodiments of limiting bandwidth in a storage device. The configurations of each embodiment detailed in FIGS. 4-7C may be determined as described above, such as a retailer setting a settings page or by choosing on-the-fly.

Figure 4:
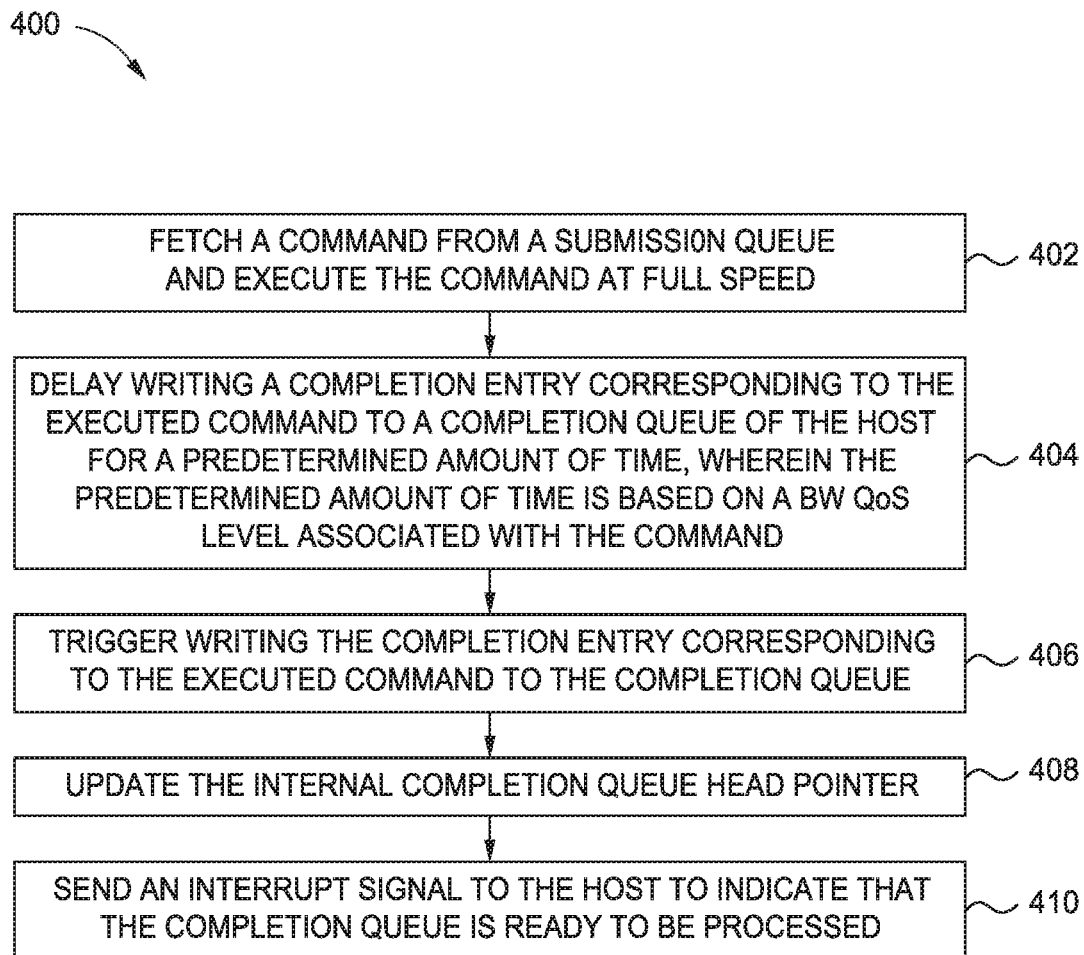
FIG. 4 is a flowchart illustrating a method of limiting bandwidth by delaying writing a completion entry to a completion queue of a host, according to one embodiment.

FIG. 4 is a flowchart illustrating a method 400 of limiting bandwidth by delaying writing a completion entry to a completion queue of a host, according to one embodiment. Method 400 may be used in conjunction with method 300. For example, not shown in method 400 are operations 350 and 352 of method 300. However, method 400 may start with operations 350 and 352 of method 300. Furthermore, method 400 may be used with the storage system 100 having a host device 104 and a storage device 106 comprising a controller 108. Method 400 may further be used with the storage system 200 having a host device 204 and a storage device 206 comprising a command processor 220.

In operation 402, a controller or command processor of the storage device fetches a command from a submission queue of a host and executes the command at full speed. One or more commands may be fetched and executed at full speed in operation 402. Full speed may be the normal operating speed or fastest bandwidth speed. There is no delay in fetching or executing the command. The commands may be read commands or write commands.

Executing the command comprises writing or transferring the command data to the host.

In operation 404, the controller or command processor delays the writing of an updated completion entry and CQ head pointer corresponding to the executed command to a completion queue of the host for a predetermined amount of time. The predetermined amount of time is based on a bandwidth (BW) QoS level associated with the command. The length of the delay is directly proportional to the priority rank or tier of the command. For example, the lower the priority rank or bandwidth QoS level associated with the command, the longer the delay may be. The higher the priority rank or bandwidth QoS level associated with the command, the shorter the delay may be. The highest priority ranking commands may have no delay at all, such as in multi-tenant systems having numerous pricing tiers.

Delaying the writing of an updated completion entry and CQ head pointer to a completion queue permits command data to be transferred into the host DRAM or into non-volatile memory while holding the completion entry in the storage device. This provides for optimal availability of the controller SRAM without acknowledging to the host the movement of the command data. Delaying the writing of the updated completion entry and CQ head pointer to the completion queue results in the host being unaware of the progress the storage device has made with the commands and data transfers.

The delay may be caused by a countdown expiring or a count up being met. The storage device may comprise a timer, which may also set the delay according to the bandwidth QoS level associated with a command. The delay may be further based on one or more of a countdown timer, a counter of a number of commands executed, available bandwidth, and a number of commands in the submission queue. The delay may be further based on a maximum or minimum bandwidth descriptor, maximum or minimum QoS assurances, and a mix of QoS and bandwidth maximums and minimums.

In operation 406, the controller or command processor triggers the writing of the completion entry corresponding to the executed command to the completion queue, and the completion entry is written to the completion queue. The writing may be triggered by the timer or countdown expiring or the count up being met. In one embodiment, the writing is triggered when one or more higher ranked priority commands are written to the completion queue.

In operation 408, the controller updates or moves the internal CQ head pointer to point to one of the newly written completion entries in the completion queue. The controller may move the CQ head pointer to any of the recently written completion entries. For example, if the controller processed three commands and wrote the updated completion entries to the completion queue, the controller may select any of the three newly written completion entries to move the CQ head pointer to notify the host that the specific command has been processed. Updating the CQ head pointer to point to a newly written completion entry reveals the one or more updated completion entries to the host.

Similar to operation 406, the controller may delay moving the CQ head pointer for a predetermined amount of time based on the BW QoS level associated with the command. The length of the delay is directly proportional to the priority rank or tier of the command. For example, the lower the priority rank or bandwidth QoS level associated with the command, the longer the delay may be. The higher the priority rank or bandwidth QoS level associated with the command, the shorter the delay may be. The highest priority ranking commands may have no delay at all, such as in multi-tenant systems having numerous pricing tiers.

Figure 5:
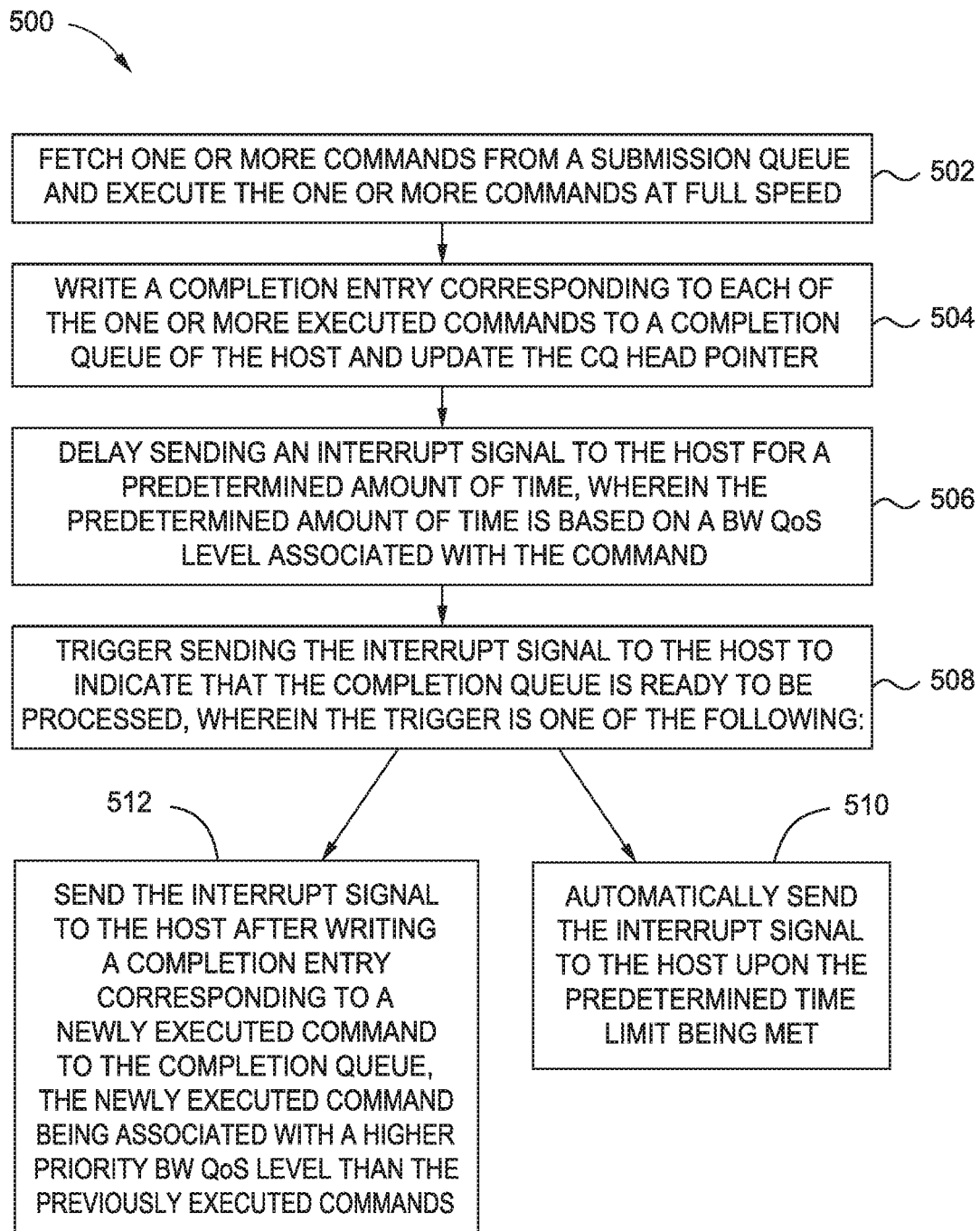
FIG. 5 is a flowchart illustrating a method of limiting bandwidth by delaying sending an interrupt signal to a host device, according to another embodiment.

In operation 410, the controller or command processor sends an interrupt signal to the host to notify or indicate to the host that the completion queue is ready to be read or processed. The interrupt signal indicates to the host that the command has been executed and data associated with the command is available in memory. The host may then process the completion queue. For example, method 400 may then precede to operations 362 and 364 of method 300. FIG. 5 is a flowchart illustrating a method 500 of limiting bandwidth by delaying sending an interrupt signal to a host device, according to one embodiment. Method 500 may be used in conjunction with method 300 and/or method 400. For example, not shown in method 500 are operations 350 and 352 of method 300. However, method 500 may start with operations 350 and 352 of method 300. Furthermore, method 500 may be used with the storage system 100 having a host device 104 and a storage device 106 comprising a controller 108. Method 500 may further be used with the storage system 200 having a host device 204 and a storage device 206 comprising a command processor 220.

In operation 502, a controller or command processor of the storage device fetches one or more commands from a submission queue of a host and executes the one or more commands at full speed. Full speed may be the normal operating speed or fastest bandwidth speed. There is no delay in fetching or executing the command. The commands may be read commands or write commands. Executing the command comprises writing or transferring the command data to the host.

In operation 504, the controller or command processor writes a completion entry corresponding to each of the one or more executed commands to a completion queue of the host and updates the CQ head pointer to point to one of the newly written completion entries. The completion entries corresponding to each executed command may be written to the completion queue in any order, regardless of the bandwidth QoS level associated with each command. Writing the completion entries to the completion queue of the host and updating the CQ head pointer does not notify the host that the commands have been executed and are ready to be read or processed by the host. Furthermore, method 500 may be used in conjunction with operations 404-408 of method 400, and may delay writing the completion entries to the completion queue and/or delay updating the CQ head pointer.

In operation 506, the controller or command processor delays sending an interrupt signal to the host for a predetermined amount of time. The predetermined amount of time is based on the bandwidth QoS level associated with each of the commands. The length of the delay is directly proportional to the priority rank or tier associated with the command. For example, the lower the priority or bandwidth QoS level associated with the command, the longer the delay may be. The higher the priority or bandwidth QoS level associated with the command, the shorter the delay may be. The highest priority ranking commands may have no delay at all, such as in multi-tenant systems having numerous pricing tiers.

The delay may be caused by a countdown expiring or a count up being met. The storage device may comprise a timer, which may also set the delay according to the bandwidth QoS level associated with a command. The delay may be further based on one or more of a countdown timer, a counter of a number of commands executed, available bandwidth, and a number of commands in the submission queue. The delay may be further based on a maximum or minimum bandwidth descriptor, maximum or minimum QoS assurances, and a mix of QoS and bandwidth maximums and minimums.

In operation 508, the controller or command processor triggers the sending of the interrupt signal to the host. The interrupt signal notifies or indicates to the host that the completion queue is ready to be read or processed. The interrupt signal indicates to the host that the command has been executed and data associated with the command is available in memory. The sending of the interrupt signal to the host may be triggered in at least two ways. A first trigger is described in operation 510 and a second trigger is described in operation 512.

In operation 510, the controller or command processor automatically sends the interrupt signal to the host upon the predetermined time limit being met. The timer or countdown expiring or the count up being met may trigger the storage device to automatically send the interrupt signal.

In operation 512, the controller or command processor sends the interrupt signal to the host after writing a completion entry corresponding to a newly executed command to the completion queue. The newly executed command is associated with a higher priority bandwidth QoS level than the previously executed commands. For example, if one or more completion entries corresponding to commands associated with a lower priority tier are written to the completion queue, a completion entry corresponding to a higher priority command written to the completion queue would trigger the sending of the interrupt signal. Thus, the writing of a completion entry associated with a higher priority command would trigger the sending of the interrupt signal and flush all previously written completion entries in the completion queue.

For example, elaborating on the above example of implementing five bandwidth QoS levels corresponding to five pricing tiers, a retailer may select the five bandwidth QoS levels and determine that level 5 is the highest priority while level 1 is the lowest priority. The retailer may further select that a completion entry associated with a level 4 command or above being written to the completion queue will flush all previously written completion entries associated with a level 3 command or below. Thus, a completion entry associated with a level 3 command or below would not trigger the sending of the interrupt signal. However, a completion entry associated with a level 4 command or above would trigger the sending of the interrupt signal and flush the completion queue.

The host may then process the completion queue after receiving the interrupt signal. For example, method 400 may then precede to operations 362 and 364 of method 300.

Figure 6:
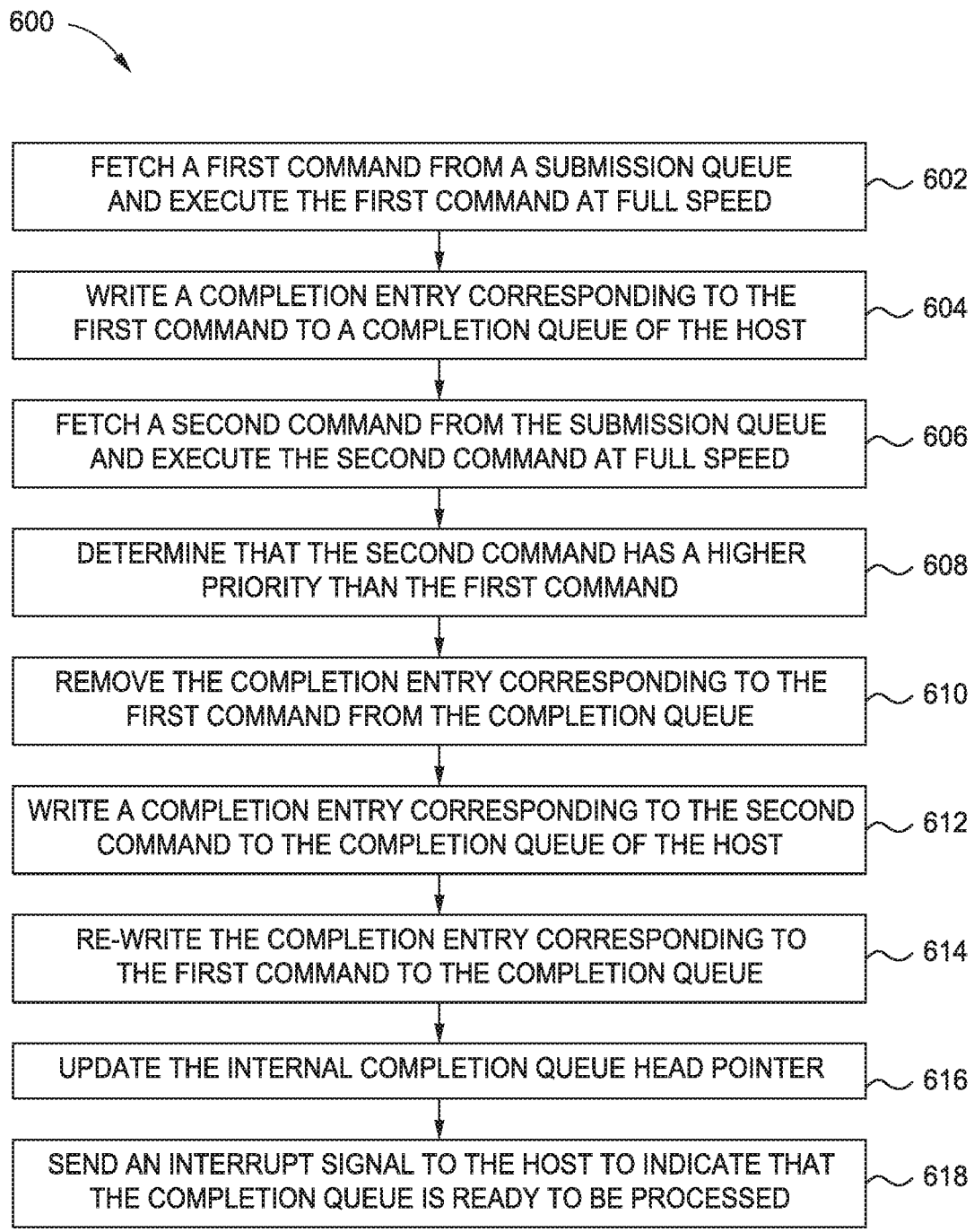
FIG. 6 is a flowchart illustrating a method of limiting bandwidth by removing a completion entry from a completion queue to reorder the completion entries, according to one embodiment.

FIG. 6 is a flowchart illustrating a method 600 of limiting bandwidth by removing a completion entry from a completion queue to reorder the completion entries, according to one embodiment. Method 600 may be used in conjunction with method 300, method 400, and/or method 500. For example, not shown in method 600 are operations 350 and 352 of method 300. However, method 600 may start with operations 350 and 352 of method 300. Furthermore, method 600 may be used with the storage system 100 having a host device 104 and a storage device 106 comprising a controller 108. Method 600 may further be used with the storage system 200 having a host device 204 and a storage device 206 comprising a command processor 220.

In operation 602, a controller or command processor of the storage device fetches a first command from a submission queue of a host and executes the first command at full speed. Full speed may be the normal operating speed or fastest bandwidth speed. There is no delay in fetching or executing the command. The commands may be read commands or write commands.

Executing the command comprises writing or transferring the command data to the host.

In operation 604, the controller or command processor writes a completion entry corresponding to the first command to a completion queue of the host. The writing of completion entry corresponding to the first command to the completion queue may be delayed, as discussed above in method 400.

In operation 606, the controller or command processor fetches a second command from the submission queue of the host and executes the second command at full speed. In operation 608, the controller or command processor determines that the second command has a higher priority than the first command. The priority of the first and second commands is determined from the associated bandwidth QoS level of the commands. The bandwidth QoS level of the commands may be retrieved by the storage device from the submission queue with the commands. The bandwidth QoS level may be determined based on the location of each command in a submission queue. In at least one implementation, the host device includes the bandwidth QoS level of a command in the header of the command. The storage device may then read the header of the command to determine the associated bandwidth QoS level.

In operation 610, the controller or command processor removes the completion entry corresponding to the first command from the completion queue. The completion entry corresponding to the first command may be erased from the completion queue, or the completion entry corresponding to the first command may be retrieved from the completion queue and brought back over to the storage device via an interface.

In operation 612, the controller or command processor writes a completion entry corresponding to the second command to the completion queue of the host. In operation 614, the controller or command processor re-writes the completion entry corresponding to the first command to the completion queue. By removing the completion entry corresponding to the first command from the completion queue and re-writing the completion entry corresponding to the first command following the writing of the completion entry corresponding to the second command, the completion queue can be reorganized or reordered in order of priority. Thus, the completion entry corresponding to the second command, which has a higher priority rank, can be processed before the completion entry corresponding to the first command, which has a lower priority rank.

In operation 616, the controller updates or moves the internal completion queue head pointer to point to one of the newly written completion entries in the completion queue. The controller may move the CQ head pointer to any of the recently written completion entries. For example, if the controller processed three commands and wrote the updated completion entries to the completion queue, the controller may select any of the three newly written completion entries to move the CQ head pointer to notify the host that the specific command and all command completion entries occurring earlier in the completion queue have been processed.

In operation 618, the controller or command processor sends an interrupt signal to the host to notify or indicate to the host that the completion queue is ready to be read or processed. The interrupt signal indicates to the host that the command has been executed and data associated with the command is available in memory. The interrupt signal may be sent immediately following the writing of the completion entry corresponding to the second command to the completion queue and moving the CQ head pointer to point to the completion entry corresponding to the second command, before the re-writing of the completion entry corresponding to the first command. Thus, operation 618 may occur prior to operation 614. The host may then process the completion queue. For example, method 600 may then precede to operations 362 and 364 of method 300.

Figure 7A:
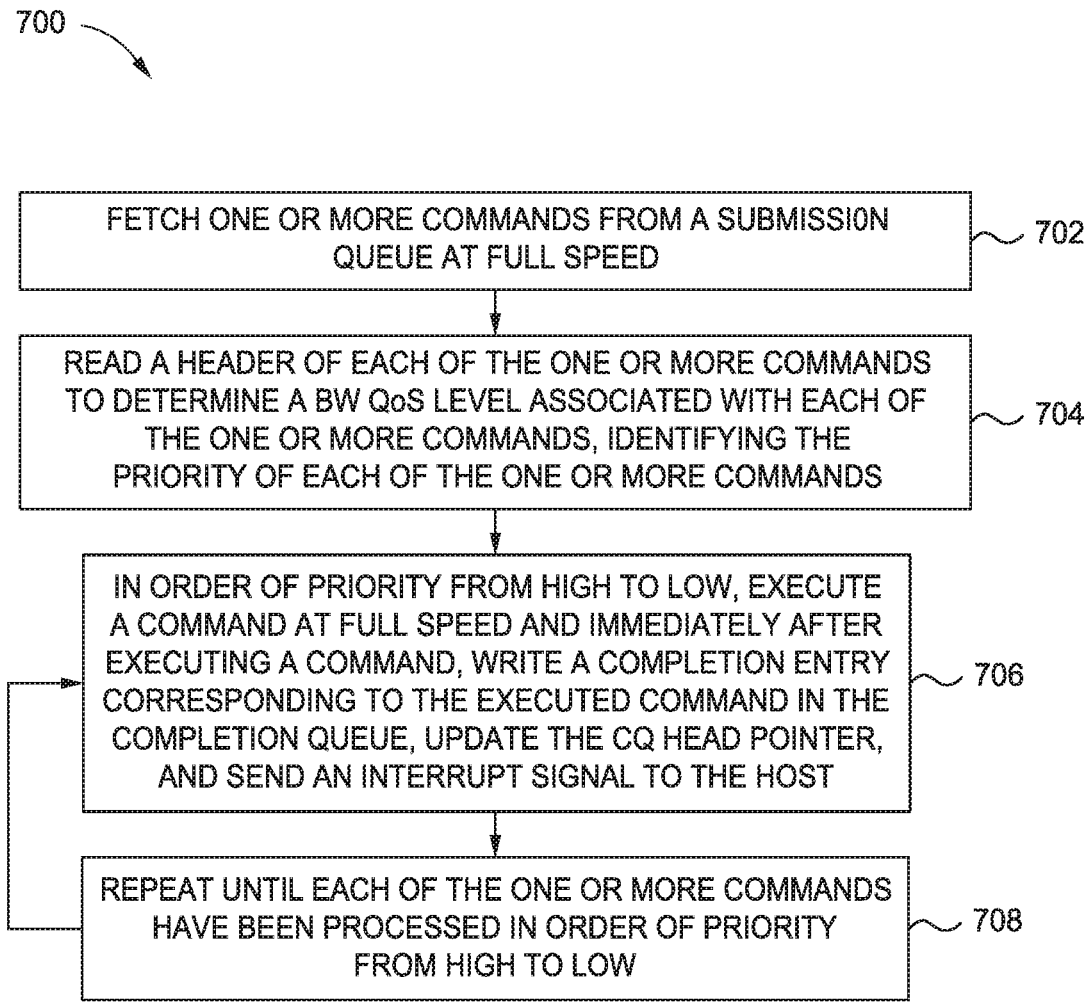
FIGS. 7A-7C are flowcharts illustrating methods of limiting bandwidth by reading a header of a command to determine the associated bandwidth QoS level before executing the command, according to various embodiments.
Figure 7B:
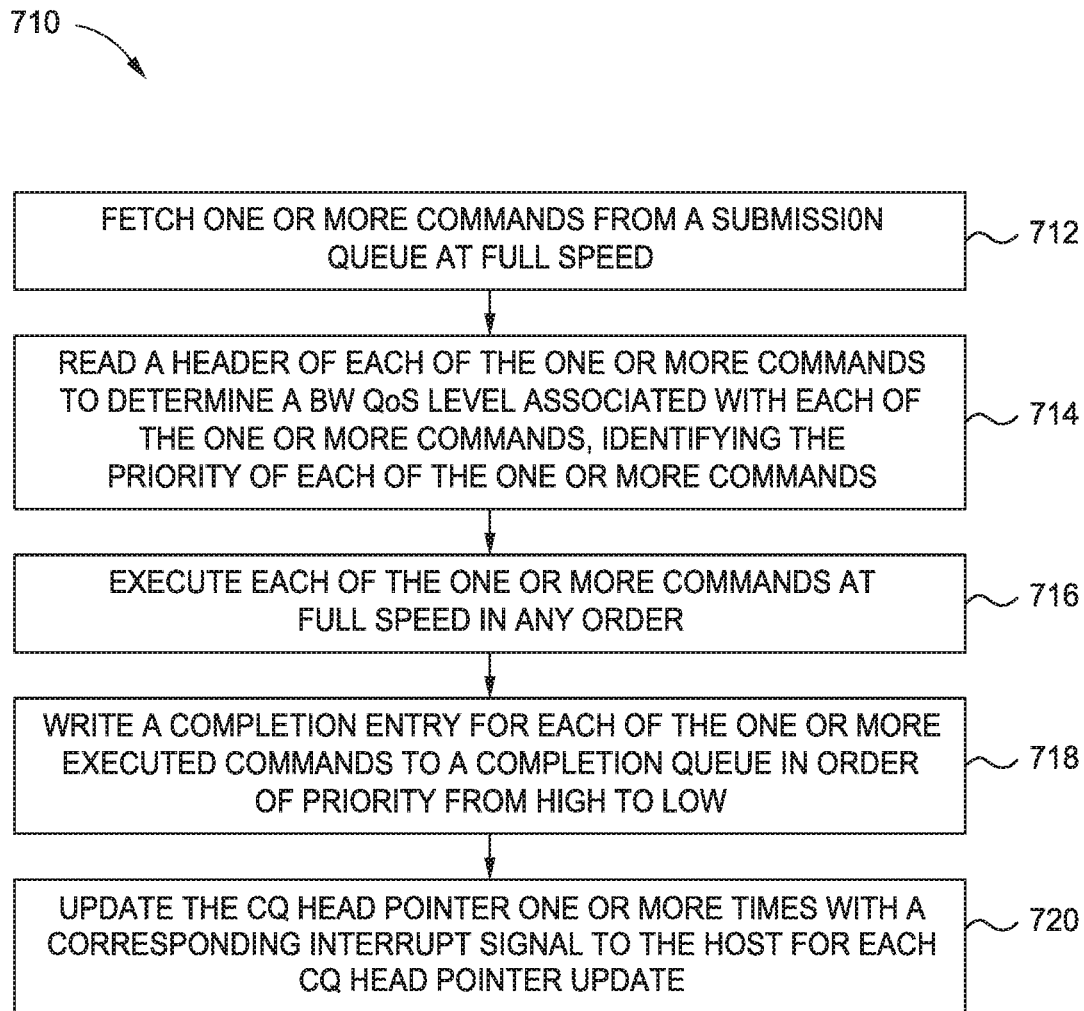
Figure 7C:
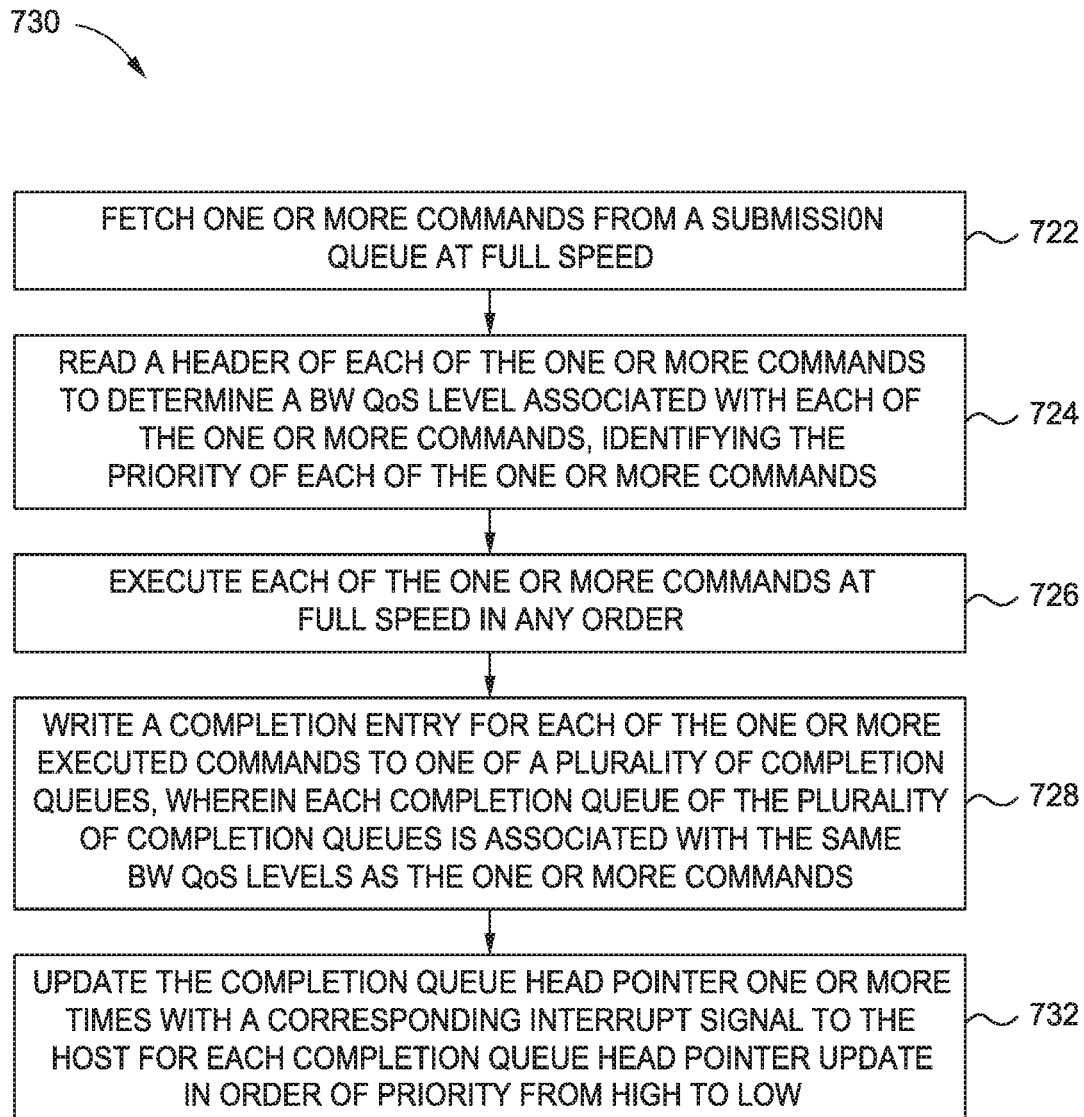

FIGS. 7A-7C are flowcharts illustrating methods 700, 710, and 730, respectively, of limiting bandwidth by reading a header of a command to determine the associated bandwidth QoS level before executing the command, according to various embodiments. Methods 700, 710, and 730 may be used in conjunction with method 300, method 400, method 500, and/or method 600. For example, not shown in methods 700, 710, and 730 are operations 350 and 352 of method 300. However, each of methods 700, 710, and 730 may start with operations 350 and 352 of method 300. Furthermore, methods 700, 710, and 730 may be used with the storage system 100 having a host device 104 and a storage device 106 comprising a controller 108. Methods 700, 710, and 730 may further be used with the storage system 200 having a host device 204 and a storage device 206 comprising a command processor 220.

FIG. 7A illustrates a method 700 of the storage device executing one or more commands in order of priority, according to one embodiment. In operation 702, a controller or command processor of the storage device fetches one or more commands from a submission queue of a host at full speed. The commands may be read commands or write commands.

In operation 704, the controller or command processor reads a header of each of the one or more commands to determine a bandwidth QoS level associated with each of the one or more commands. The associated bandwidth QoS level of the commands identifies the priority of each of the one or more commands. The header of each command may comprises the bandwidth QoS level associated with the command, as well as other information. The host may write a header for each command when writing the commands to the submission queue. Thus, when the commands are fetched in operation 702, the header of each command is fetched as well. As such, the priority tier and bandwidth QoS level associated with each command can be determined prior to executing the commands.

In operation 706, in order of priority from high to low, the controller or command processor executes one command at a time at full speed. Immediately after executing a command, the controller or command processor writes a completion entry corresponding to the executed command in the completion queue, updates the CQ head pointer to point to the completion entry corresponding to the executed command in the completion queue, and sends an interrupt signal to the host. Thus, starting with the highest priority commands, the commands are executed and written to the completion queue as a completion entry one at a time, the CQ head pointer is updated, and an interrupt signal is sent.

In operation 708, the controller or command processor repeats operation 706 one or more times until each of the one or more commands have been processed in order of priority from high to low. Each time operation 706 is repeated, a command with the same or decremented priority tier from the previously processed command is processed. The host may then process the completion queue. For example, method 700 may then precede to operations 362 and 364 of method 300.

FIG. 7B illustrates a method 710 of the storage device sending completion entries corresponding to one or more executed commands to a completion queue of the host in order of priority, according to another embodiment. Method 710 may be used in conjunction with method 700.

In operation 712, a controller or command processor of the storage device fetches one or more commands from a submission queue of a host at full speed. The commands may be read commands or write commands. In operation 714, the controller or command processor reads a header of each of the one or more commands to determine a bandwidth QoS level associated with each of the one or more commands. The associated bandwidth QoS level of the commands identifies the priority of each of the one or more commands.

In operation 716, the controller or command processor executes each of the one or more commands at full speed in no particular order. The commands may be executed in any order, such as the order in which the commands were fetched from the submission queue.

In operation 718, the controller or command processor writes a completion entry for each of the one or more executed commands to a completion queue in order of priority from high to low. After each command is executed, the controller or command processor uses the bandwidth QoS level determined in operation 714 for each command to select the order in which to write the completion entries corresponding to each command to the completion queue. The executed commands associated with the highest priority bandwidth QoS level are written to the completion queue first, followed by the executed commands associated with lower priority bandwidth QoS levels.

In operation 720, the controller or command processor updates the CQ head pointer one or more times with a corresponding interrupt signal to the host for each CQ head pointer update to notify or indicate to the host that the completion queue is ready to be read or processed. Updating the CQ head pointer with a corresponding interrupt signal indicates that the command has been executed and data associated with the command is available in memory. The CQ head pointer and interrupt signal may be updated immediately following the writing of each completion entry to the completion queue, or the CQ head pointer and interrupt signal may be updated after all completion entries of the executed fetched commands are written to the completion queue. In one embodiment, the CQ head pointer and interrupt signal may be updated after one or more completion entries corresponding to high priority commands are written to the completion queue, such as described above in operation 512 of method 500. The host may then process the completion queue. For example, method 710 may then precede to operations 362 and 364 of method 300.

FIG. 7C illustrates a method 730 of the storage device sending completion entries corresponding to each executed command to a corresponding priority ranked completion queue of the host, according to yet another embodiment. Method 730 may be used in conjunction with method 700 and/or method 710.

In operation 722, a controller or command processor of the storage device fetches one or more commands from a submission queue of a host at full speed. The commands may be read commands or write commands. In operation 724, the controller or command processor reads a header of each of the one or more commands to determine a bandwidth QoS level associated with each of the one or more commands. The associated bandwidth QoS level of the commands identifies the priority of each of the one or more commands.

In operation 726, the controller or command processor executes each of the one or more commands at full speed in no particular order. The commands may be executed in any order, such as the order in which the commands were fetched from the submission queue.

In operation 728, the controller or command processor writes a completion entry for each of the one or more executed commands to one of a plurality of completion queues. Each completion queue of the plurality of completion queues may be associated with the same bandwidth QoS levels as the one or more commands. For example, if the storage device is set up with five bandwidth QoS levels corresponding to five pricing tiers, five corresponding completion queues may be utilized. Thus, the lowest priority commands (e.g., level 1 commands) will all be sent to a first completion queue of the plurality of completion queues, and the highest priority commands (e.g., level 5 commands) will all be sent to a second completion queue of the plurality of completion queues. Operation 728 may incorporate operation 718 of method 710 to write the completion entries to the respective completion queue in order of priority from high to low. For example, the highest priority commands may be sent to their respective completion queue before the lower priority commands are written to their respective completion queue.

In operation 732, the controller or command processor updates the CQ head pointer one or more times with a corresponding interrupt signal to the host for each CQ head pointer update in order of priority from high to low. In an embodiment where the completion entries are written to the respective completion queues in order of priority, a CQ head pointer and interrupt signal may be sent to the host as soon as a completion entry is full, or after each individual completion entry is written to a completion queue. For example, in one embodiment, if the completion entries corresponding to the highest priority commands are first written to the corresponding highest priority completion queue, a CQ head pointer and interrupt signal may be sent as soon all completion entries corresponding to the highest priority commands are written. In another embodiment, an interrupt signal may be sent to the host immediately following the writing of a completion entry corresponding to a completion queue in order of priority from high to low. For example, starting with the highest priority completion queue and highest priority command, multiple interrupt signals may be sent back-to-back as each individual highest priority command entry is written to the highest priority completion queue. In another embodiment, the CQ head pointer is updated only once after all completion entries are written to the respective completion queues. The host may then process the completion queues. For example, method 730 may then precede to operations 362 and 364 of method 300.

By fetching and executing one or more commands at full speed, the storage device may receive the maximum amount of information, which helps provide for more reliable and accurate bandwidth QoS levels to be delivered to SLA customers of all grades or tiers. Additionally, conflicts of the resources of a storage device can be reduced, and data can be transferred without acknowledging to the host the movement of the data. Various bandwidth QoS levels may be utilized without slowing down the data flow rate or consuming excess bandwidth, resulting in more precise and accurate quantities of bandwidth offered to customers.

Furthermore, a retailer may customize the bandwidth QoS levels and parameters, either on-the-fly or predetermined. By permitting a retailer to determine the bandwidth QoS levels and associated parameters, such as delay times, the retailer can precisely tailor the configuration and settings as desired such that the configurations will be most beneficial to the individual retailer needs. As such, bandwidth can be effectively and reliably limited as per SLAs while freeing storage device resources and reducing contention.

In one embodiment, a method of operating a storage device comprises executing, by a controller of the storage device, a command associated with a bandwidth quality-of-service level. The command is executed at full speed. The method further comprises delaying writing a completion entry corresponding to the executed command for a predetermined amount of time. The predetermined amount of time is based on the associated bandwidth quality-of-service level. The method comprises triggering the completion entry corresponding to the executed command to be written to a completion queue. The writing of the completion entry to the completion queue is triggered after the predetermined amount of time is met.

The method may further comprise receiving a doorbell signaling the command is present in a submission queue prior to executing the command. The method may further comprise fetching the command from the submission queue prior to executing the command at full speed. The associated bandwidth quality-of-service level of the command may determine the priority of the command. The predetermined amount of time may be longer for lower priority bandwidth quality-of-service levels than higher priority bandwidth quality-of-service levels. The predetermined amount of time may be based on a countdown, a count up, or timer. The method may further comprise delaying updating a completion queue head pointer to point to the completion entry for a predetermined amount of time. The predetermined amount of time may be based on the associated bandwidth quality-of-service level.

In another embodiment, a storage device comprises one or more memory devices and a controller coupled to the one or more memory devices. The controller is configured to fetch a command associated with a bandwidth quality-of-service level from a submission queue at full speed, execute the command, write a completion entry corresponding to the executed command to a completion queue, and delay sending an interrupt signal indicating the completion queue is ready to be read. The delay is based on the bandwidth quality-of-service level associated with the command.

The associated bandwidth quality-of-service level of the command may determine the priority of the command. The controller may comprise a settings page, the settings page determining one or more bandwidth quality-of-service levels. The one or more bandwidth quality-of-service levels may be based on one or more of a time of day, a customer number, a quantity of commands previously retrieved, and available bandwidth. The delay may be longer for lower priority bandwidth quality-of-service levels than higher priority bandwidth quality-of-service levels. The delay may be further based on one or more of a countdown timer, a counter of a number of commands executed, available bandwidth, and a number of commands in the submission queue. The storage device may further comprise a bandwidth limiter coupled to the controller.

In yet another embodiment, a storage system comprises a host device and a storage device coupled to the host device. The storage device comprises one or more memory devices and a controller coupled to the one or more memory devices. The controller is configured to fetch a plurality of commands from a submission queue at full speed, read headers of each of the plurality of commands to determine an associated bandwidth quality-of-service level of each of the plurality of commands, and execute the plurality of commands in order of high to low priority based on the associated bandwidth quality-of-service level of each of the plurality of commands.

The controller may be further configured to send completion entries corresponding to each of the plurality of commands to a plurality of completion queues after each of the plurality of commands are executed. Each completion queue of the plurality of completion queues may be associated with a different bandwidth quality-of-service level. The associated bandwidth quality-of-service level of each of the plurality of commands may correspond to the different bandwidth quality-of-service levels associated with the plurality of completion queues. The controller may be further configured to send one or more interrupt signals to the host device to indicate that at least one of the plurality of completion queues is ready to be read. The controller may send the one or more interrupt signals to the host device in order of high to low priority based on the associated bandwidth quality-of-service level of each of the plurality of completion queues.

While the foregoing is directed to embodiments of the present disclosure, other and further embodiments of the disclosure may be devised without departing from the basic scope thereof, and the scope thereof is determined by the claims that follow.

What is claimed is:

1. A method of operating a storage device, comprising:
   executing, by a controller of the storage device, a command associated with a bandwidth quality-of-service level, wherein the command is executed at full speed;
   delaying writing a completion entry corresponding to the executed command for a predetermined amount of time, wherein the predetermined amount of time is based on the associated bandwidth quality-of-service level; and
   triggering the completion entry corresponding to the executed command to be written to a completion queue, wherein the writing of the completion entry to the completion queue is triggered after the predetermined amount of time is met.

2. The method of claim 1, further comprising receiving a doorbell signaling the command is present in a submission queue prior to executing the command.

3. The method of claim 2, further comprising fetching the command from the submission queue prior to executing the command at full speed.

4. The method of claim 1, wherein the associated bandwidth quality-of-service level of the command determines the priority of the command.

5. The method of claim 4, wherein the predetermined amount of time is longer for lower priority bandwidth quality-of-service levels than higher priority bandwidth quality-of-service levels.

6. The method of claim 1, wherein the predetermined amount of time is based on a countdown, a count up, or timer.

7. The method of claim 1, further comprising delaying updating a completion queue head pointer to point to the completion entry for a predetermined amount of time, wherein the predetermined amount of time is based on the associated bandwidth quality-of-service level.

8. A storage device, comprising:
   one or more memory devices; and
   a controller coupled to the one or more memory devices, wherein the controller is configured to:
      fetch a first command associated with a first bandwidth and first a quality-of-service level and a second command associated with a second bandwidth and a second quality-of-service level from a submission queue at full speed, the first bandwidth and the first quality-of-service level having a lower priority rank than the second bandwidth and the second quality-of-service level;
      execute the first command and the second command at full speed in the order in which the first and second commands were fetched;
      write a first completion entry corresponding to the first executed command and a second completion entry corresponding to the second executed command to a completion queue; and
      delay sending an interrupt signal indicating the completion queue is ready to be read, wherein the delay is based on the second bandwidth and the second quality-of-service level associated with the second command.

9. The storage device of claim 8, wherein the associated bandwidth and quality-of-service level of a fetched command determines the priority of the fetched command.

10. The storage device of claim 9, wherein the controller comprises a settings page, the settings page determining one or more bandwidth quality-of-service levels.

11. The storage device of claim 10, wherein the one or more bandwidth and quality-of-service levels are based on one or more of a time of day, a customer number, a quantity of commands previously retrieved, and available bandwidth.

12. The storage device of claim 10, wherein the delay is longer for lower priority bandwidth quality-of-service levels than higher priority bandwidth and quality-of-service levels.

13. The storage device of claim 8, wherein the delay is further based on one or more of a countdown timer, a counter of a number of commands executed, available bandwidth, and a number of commands in the submission queue.

14. The storage device of claim 8, further comprising a bandwidth limiter coupled to the controller.

15. A storage device, comprising:
   one or more memory devices;
   means for executing a command associated with a bandwidth quality-of-service level, wherein the command is executed at full speed;
   means for delaying writing a completion entry corresponding to the executed command for a predetermined amount of time, wherein the predetermined amount of time is based on the associated bandwidth quality-of-service level;
   means for triggering the completion entry corresponding to the executed command to be written to a completion queue, wherein the writing of the completion entry to the completion queue is triggered after the predetermined amount of time is met; and means for delaying sending an interrupt signal indicating the completion queue is ready to be read, wherein the delay is based on the associated bandwidth quality-of-service level of the command.

16. The storage device of claim 15, wherein the associated bandwidth quality-of-service level of the command determines the priority of the command, and wherein the associated bandwidth quality-of-service level is based on one or more of a time of day, a customer number, a quantity of commands previously retrieved, and available bandwidth.

17. The storage device of claim 15, further comprising means for delaying updating a completion queue head pointer to point to the completion entry for a predetermined amount of time, wherein the predetermined amount of time is based on the associated bandwidth quality-of-service level.

18. The storage device of claim 15, wherein the predetermined amount of time is longer for lower priority bandwidth quality-of-service levels than higher priority bandwidth quality-of-service levels, and wherein the predetermined amount of time is based on a countdown, a count up, or timer.

19. The storage device of claim 15, wherein the delay of the sending of the interrupt signal is longer for lower priority bandwidth quality-of-service levels than higher priority bandwidth quality-of-service levels, and wherein the delay of the sending of the interrupt signal is further based on one or more of a countdown timer, a counter of a number of commands executed, available bandwidth, and a number of commands in the submission queue.

20. The storage device of claim 15, further comprising:
means for receiving a doorbell signaling the command is present in a submission queue prior to executing the command; and
means for fetching the command from the submission queue prior to executing the command at full speed.

* * * * *